US007613360B2

(12) United States Patent
Ma et al.

(10) Patent No.: US 7,613,360 B2
(45) Date of Patent: Nov. 3, 2009

(54) MULTI-SPECTRAL FUSION FOR VIDEO SURVEILLANCE

(75) Inventors: Yunqian Ma, Roseville, MN (US); Michael E. Bazakos, Bloomington, MN (US)

(73) Assignee: Honeywell International Inc, Morristown, NJ (US)

( * ) Notice: Subject to any disclaimer, the term of this patent is extended or adjusted under 35 U.S.C. 154(b) by 710 days.

(21) Appl. No.: 11/345,203

(22) Filed: Feb. 1, 2006

(65) Prior Publication Data

US 2007/0177819 A1    Aug. 2, 2007

(51) Int. Cl.
*G06K 9/36* (2006.01)
*G06K 9/00* (2006.01)

(52) U.S. Cl. .................................. 382/284; 382/100

(58) Field of Classification Search ................ 382/284, 382/294, 276, 312, 318, 191, 100, 154; 348/33, 348/47, 48
See application file for complete search history.

(56) References Cited

U.S. PATENT DOCUMENTS

| | | | |
|---|---|---|---|
| 5,691,765 A | 11/1997 | Schieltz et al. | 348/335 |
| 5,870,135 A | 2/1999 | Glatt et al. | 348/39 |
| 6,898,331 B2 | 5/2005 | Tiana | 382/274 |
| 7,340,099 B2* | 3/2008 | Zhang | 382/191 |
| 7,355,182 B2* | 4/2008 | Szu | 250/370.08 |
| 2003/0081564 A1 | 5/2003 | Chan | 370/328 |
| 2003/0174210 A1 | 9/2003 | Vimpari et al. | 348/152 |
| 2003/0231804 A1 | 12/2003 | Bacarella et al. | 382/284 |
| 2004/0130630 A1 | 7/2004 | Ostromk | 348/218.1 |
| 2004/0141659 A1 | 7/2004 | Zhang | 382/284 |
| 2004/0189801 A1 | 9/2004 | Chang | 348/143 |
| 2004/0257444 A1 | 12/2004 | Maruya et al. | 348/169 |
| 2005/0094994 A1 | 5/2005 | Paolantonio et al. | 396/427 |
| 2005/0162268 A1 | 7/2005 | Grindstaff et al. | 340/531 |
| 2005/0162515 A1 | 7/2005 | Venetianer et al. | 348/143 |
| 2005/0225635 A1 | 10/2005 | Meitzler et al. | 348/148 |
| 2006/0091284 A1* | 5/2006 | Viens et al. | 250/201.9 |
| 2008/0011941 A1* | 1/2008 | Couture et al. | 250/214 VT |

OTHER PUBLICATIONS

Comparative Image Fusion Analysais, F. Sadjadi, Lockheed Martin Corporation.

* cited by examiner

*Primary Examiner*—Yon Couso
(74) *Attorney, Agent, or Firm*—Kris T. Fredrick

(57) ABSTRACT

A multi-spectral imaging surveillance system and method in which a plurality of imaging cameras is associated with a data-processing apparatus. A module can be provided, which resides in a memory of said data-processing apparatus. The module performs fusion of a plurality images respectively generated by varying imaging cameras among said plurality of imaging cameras. Fusion of the images is based on a plurality of parameters indicative of environmental conditions in order to achieve enhanced imaging surveillance thereof. The final fused images are the result of two parts: an image fusion portion, and a knowledge representation part. For the final fusion, many operators can be utilized, which can be applied between the image fusion result and the knowledge representation portion.

17 Claims, 7 Drawing Sheets

MULTI-SPECTRAL FUSION FOR VIDEO SURVEILLANCE

TECHNICAL FIELD

Embodiments are generally related to data processing methods and systems. Embodiments are also related to image processing techniques, devices and systems. Embodiments are additionally related to sensors utilized in surveillance. Embodiments are also related to multi-spectral fusion techniques and devices for generating images in video surveillance systems.

BACKGROUND

Security systems are finding an ever increasing usage in monitoring installations. Such systems can range from one or two cameras in a small store up to dozens of cameras covering a large mall or building. In general these systems display the video signals as discrete individual pictures on a number of display panels. When there are a large number of cameras, greater than the number of display panels, the systems have a control means that changes the input signal to the displays so as to rotate the images and scan the entire video coverage within a predetermined time frame. Such systems also usually have means to stop the progression of the image sequence to allow study of a particular area of interest. Such systems have proved useful in monitoring areas and frequently result in the identification of criminal activity.

The use of video cameras in such security and surveillance systems typically involves some form of video image processing. One type of image processing methodology involves image fusion, which is a process of combining images, obtained by sensors of different wavelengths simultaneously viewing of the same scene, to form a composite image. The composite image is formed to improve image content and to make it easier for the user to detect, recognize and identify targets and increase his or her situational awareness.

A specific type of image fusion is multi-spectral fusion, which is a process of combining data from multiple sensors operating at different spectral bands (e.g., visible, near infrared, long-wave, infrared, etc.) to generate a single composite image, which contains a complete, accurate and robust description of the scene than any of the individual sensor images.

Current automated (e.g., computerized) video surveillance systems, particularly those involving the use of only video cameras, are plagued by a number of problems. Such video surveillance systems typically generate high false alarm rates, and generally only function well under a narrow range of operational parameters. Most applications, however, especially those that take place outdoors, require a wide range of operation and this causes current surveillance systems to fail due to high false alarm rates and/or frequent misses of an object of interest.

The operator is then forced to turn the system off, because the system in effect cannot be "trusted" to generate reliable data. Another problem inherent with current video surveillance systems is that such systems are severely affected by lighting conditions and weather. Future surveillance systems must be able to operate in a 24 hours, 7 day continuous mode. Most security systems operating during the night are not well lit or all located in situations in which no lighting is present at all. Video surveillance systems must be hardened against a wide range of weather conditions (e.g., rain, snow, dust, hail, etc.).

The objective of performing multi-sensor fusion is to intelligently combine multi-modality sensor imagery, so that a single view of a scene can be provided with extended information content, and enhanced quality video for the operator or user. A number of technical barriers exist, however, to achieving this goal. For example, "pixel level weighted averaging" takes the weighted average of the pixel intensity of varying source images. The technical problem of simple weighted average of pixel intensity is that such a methodology does not consider different environmental conditions.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

It is, therefore, one aspect of the present invention to provide an improved data-processing system and method.

It another aspect of the present invention to provide an improved image processing system and method.

It is an additional aspect of the present invention to provide for an improved video surveillance system.

It is a further aspect of the present invention to provide for an improved multi-spectral image fusion system and method for video surveillance systems.

The aforementioned aspects of the invention and other objectives and advantages can now be achieved as described herein. A multi-spectral video surveillance system is disclosed. In general, a plurality of imaging cameras is associated with a data-processing apparatus. A module can be provided, which resides in a memory of the data-processing apparatus, wherein the module performs fusion of a plurality of images respectively generated by varying imaging cameras among the plurality of imaging cameras. Fusion of the images can be based on a plurality of parameters indicative of environmental conditions in order to achieve enhanced video surveillance thereof. The fusion of images is also based on Principal Component Analysis (PCA).

The imaging cameras can include a visible color video camera, a near IR camera, a mid wave IR camera, and a long wave IR camera. The visible color video camera, the near IR camera, the mid wave IR camera, and the long wave IR camera communicate with one another and the data-processing apparatus.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
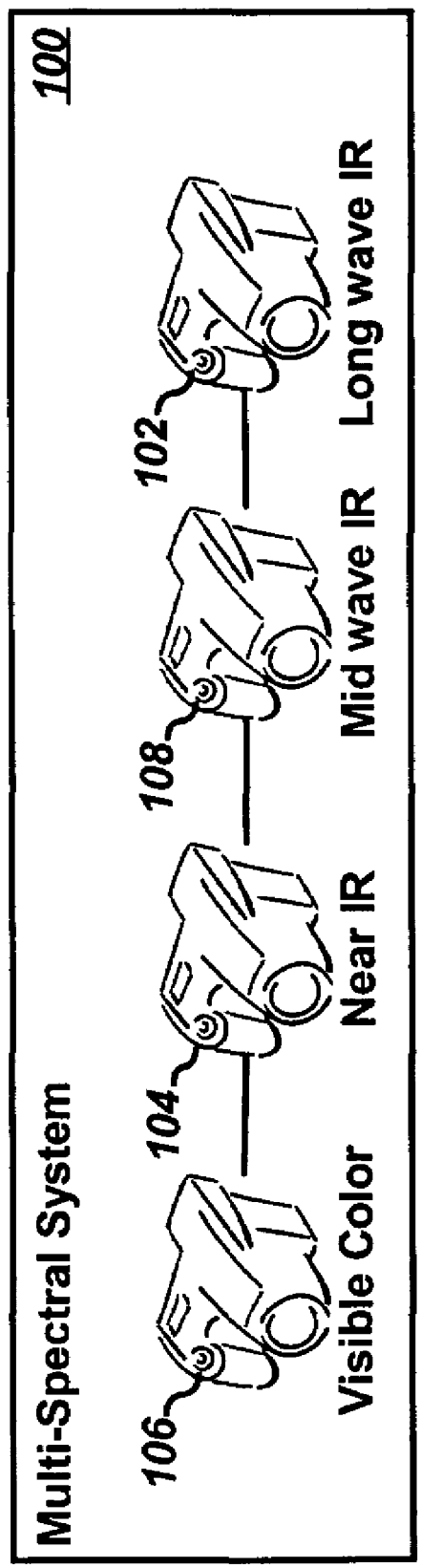
FIG. 1 illustrates a block diagram depicting a multi-spectral fusion imaging surveillance system, which can be implemented in accordance with a preferred embodiment.

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present invention. The following detailed description is, therefore not to be taking in a limiting sense, and the scope of the present invention is defined only by the appended claims.

The particular values and configurations discussed in these non-limiting examples can be varied and are cited merely to illustrate at least one embodiment of the present invention and are not intended to limit the scope of the invention.

One of the advantages of performing multi-sensor fusion is that due to the actual fusion process by intelligent combination of multi-modality sensor imagery, a single view of a scene can be provided with extend information content, thereby providing greater quality. In the context of video surveillance, this means that 'greater quality' results in more efficient and accurate surveillance functions, which is better for the operator or user, motion detection, tracking, and/or classification.

Multi-sensor fusion can take place at different levels of information representation. A common categorization can involve distinguishing between pixel, feature and decision levels, although crossings may exist between such parameters. Image fusion at pixel level amounts to integration of low-level information, in most cases physical measurements such as intensity. Such a methodology can generate a composite image in which each pixel is determined from a set of corresponding pixels in the various sources. Fusion at a feature level, for example, requires first an extraction (e.g., by segmentation procedures) of the features contained in the various input sources. Those features can be identified by characteristics such as size, shape, contrast and texture. The fusion is thus based on those extracted features and enables the detection of useful features with higher confidence.

Fusion at a decision level allows the combination of information at the highest level of abstraction. The input images are usually processed individually for information extraction and classification. This results in a number of symbolic representations which can be then fused according to decision rules that reinforce common interpretation and resolve differences. The choice of the appropriate level depends on many different factors such as the characteristics of the physical sources, the specific application and the tools that are available.

At the same time, however, the choice of the fusion level determines the pre-processing that is required. For instance, fusion at pixel level (e.g., pixel fusion) requires co-registered images at sub-pixel accuracy because pixel fusion methods are very sensitive to mis-registration. Today, most image fusion applications employ pixel fusion methods. The advantage of pixel fusion is that the images used contain the original information. Furthermore, the algorithms are rather easy to implement and time efficient.

Figure 2:
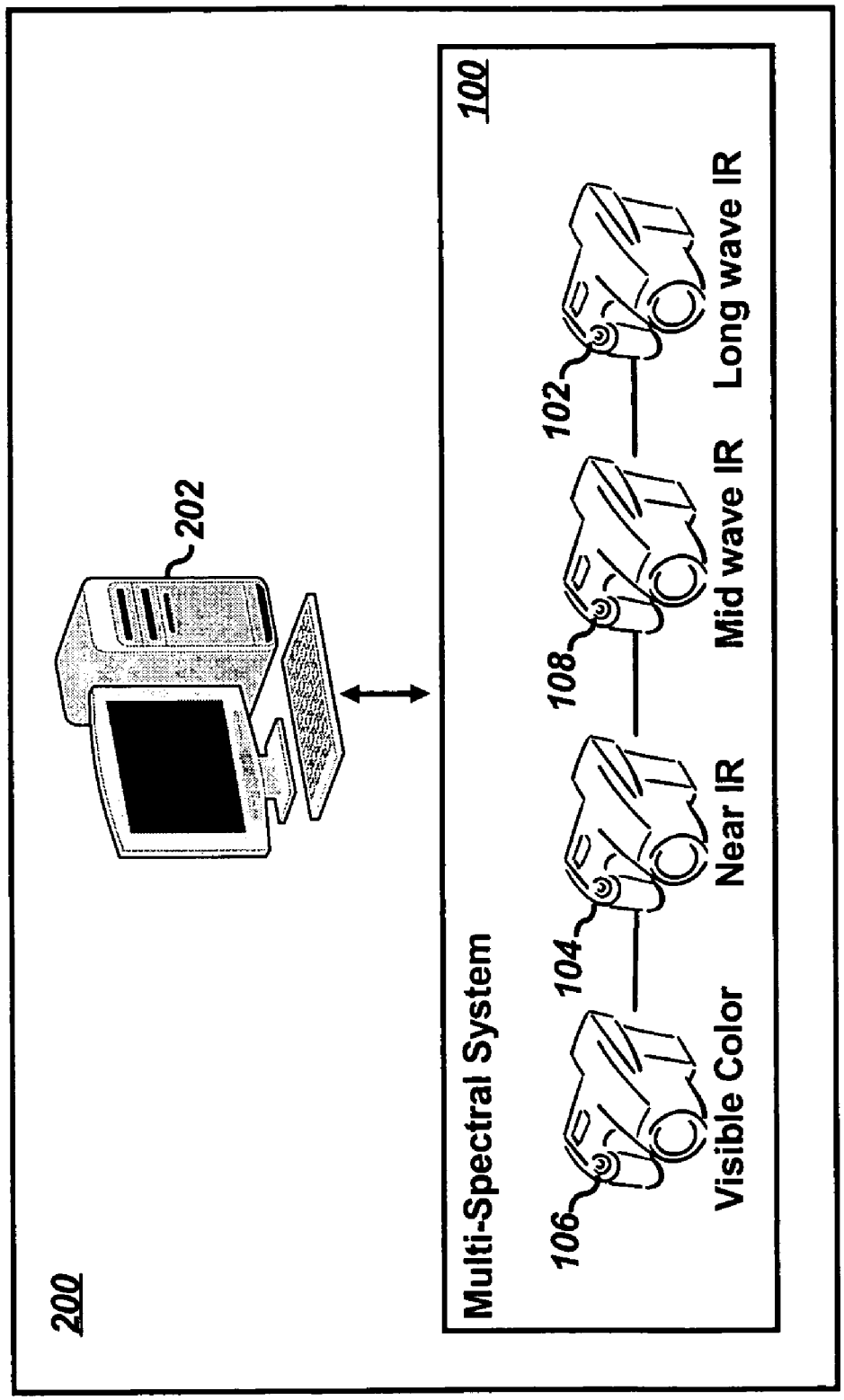
FIG. 2 illustrates a block diagram of a system that incorporates the multi-spectral fusion imaging surveillance system of FIG. 1 in accordance with a preferred embodiment.

FIG. 1 illustrates a block diagram depicting a multi-spectral fusion imaging surveillance system 100, which can be implemented in accordance with a preferred embodiment. System 100 is generally composed of a visible color video camera 106, a near infrared (IR) camera 104, a mid wave IR camera 108, and a long wave IR camera 102. FIG. 2 illustrates a block diagram of a system 200 that incorporates the multi-spectral fusion imaging surveillance system 100 of FIG. 1 in accordance with a preferred embodiment. System 200 can incorporate the use of a data-processing apparatus 202 that communicates with system 100 and specifically, one or more of the imaging cameras 102, 104, 106, and 108. The data-processing apparatus 202 can be implemented as, for example, a computer workstation, computer server, personal computer, portable laptop computer, and the like. Note that in FIGS. 1-2, identical or similar parts or elements are generally indicated by identical reference numerals. Note that the imaging cameras 102, 104, 106 and 108 can be provided in the form of video cameras.

Figure 3:
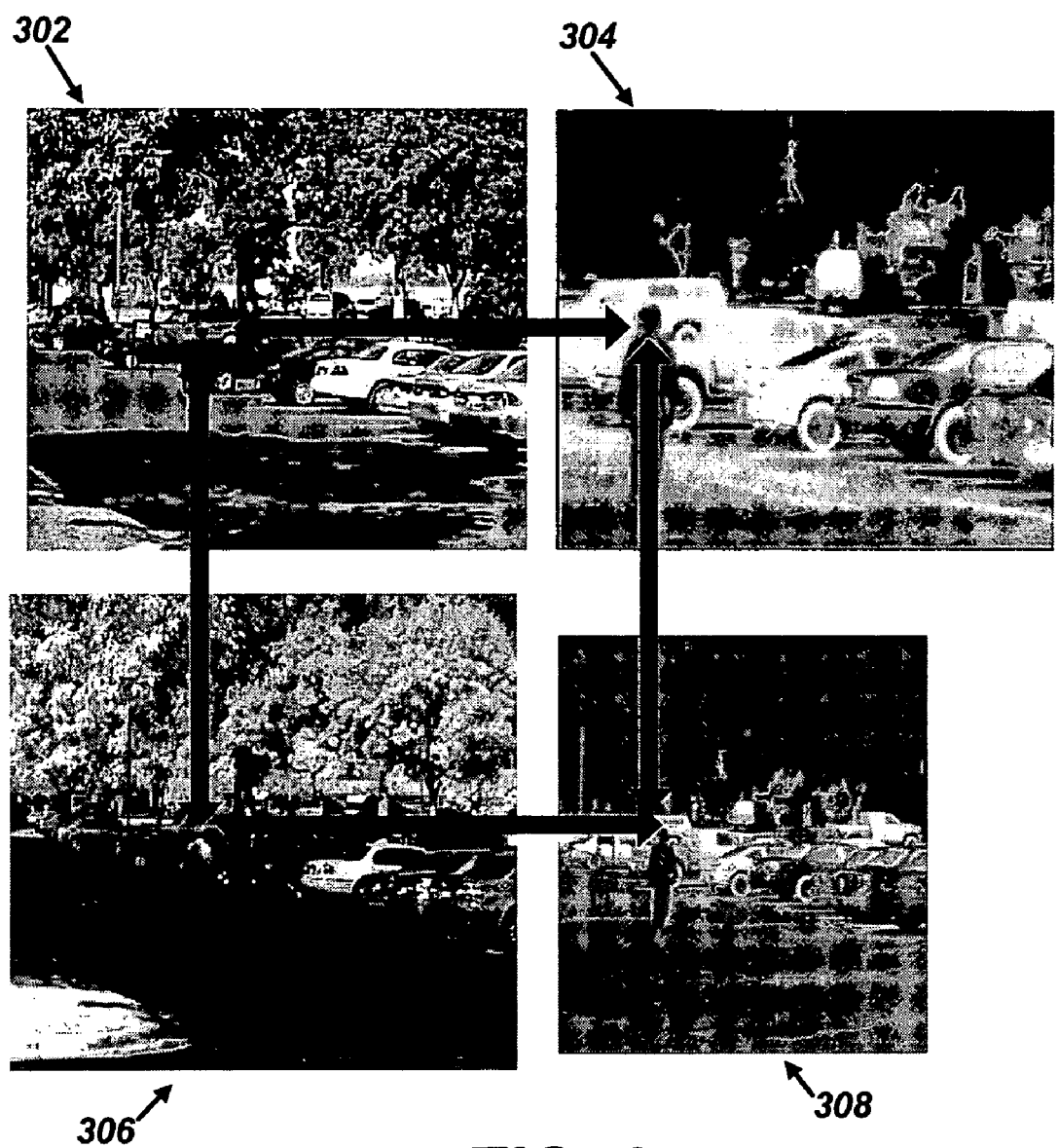
FIG. 3 illustrates a plurality of images captured utilizing the system depicted in FIG. 2 in accordance with a preferred embodiment.

FIG. 3 illustrates a plurality of images 302, 304, 306, and 308 captured utilizing the system 200 depicted in FIG. 2 in accordance with a preferred embodiment. FIG. 3 generally illustrates correspondence points in the four band images 302, 304, 306, and 308. In general, the visible color video camera 106 can be implemented as a camera operating based on a visible wavelength in a range of, for example, 0.4 µm to 0.8 µm. The near IR camera 104, on the other hand, can operate in wavelength range of, for example, 0.9 µm to 1.7 µm and can incorporate the use of a sensor head that employs, for example, a 320×256 Indium Gallium Arsenide (InGaAs) focal plane array (FPA). Note that InGaAs detectors are highly sensitive to energy in the near-infrared (NIR) and shortwave infrared (SWIR) wavebands from 0.9 to 1.7 µm, well beyond the range of devices such as, for example, silicon CCD cameras.

The mid wave IR camera 108 can be implemented as a video camera that utilizes a high-speed snapshot indium antimonide focal plane array and miniaturized electronics. Camera 108 can also incorporate the use of a 256×256 InSb detector, depending upon design considerations and system operational goals. The spectral response for the mid wave IR camera 108 may be, for example, 3 to 5 µm. The long wave IR camera 102 preferably operates in a wavelength range of, for example 7.5 µm to 13.5 µm. It is suggested the video camera 102 be implemented as a video camera with high resolution within a small, rugged package, which is ideal for outdoor video surveillance.

In general, camera calibration can be performed for one or more of cameras 102, 104, 106, and 108. For the long wave IR camera 102, calibration for temperature can be accomplished utilizing Digital Acquisition System (DAS) electronics. The post acquisition non-uniformity compensation can be performed within the context of a DAS. For the mid wave IR camera 108, a black body can be utilized to set two point temperatures $T_H$ and $T_L$. DOS software can also be utilized for the calibration of IR camera 108. The near IR camera 104 can generate a digital output, which is fed to a National Instrument (NI) card. Methodologies can be processed to perform non-uniformity correction (i.e., though gain and offset to make a focal plane response uniform) and bad pixel replacement.

Before performing a fusion operation, an important pre-processing step can be implemented involving registration (spatial and temporal alignment, such as field of view, resolution and lens distortion), in order to ensure that the data at each source refers to the same physical structures. In some embodiments, maximization on mutual information can be utilized to perform automatic registration on multi-sensor images.

In a preferred embodiment, however, a simple control point mapping operation can be performed due to the primary focus on fusion imaging. The feature corresponding points can be chosen interactively, and registration can be performed by matching the corresponding points depicted, for example, in FIG. 3 through a transformation matrix and shirt vector. The visible camera output can be split into 3 bands (red, green, blue), and can include three additional IR bands (Long IR, Middle IR, Near IR). Six bands can be available as inputs for pixel fusion. These original six monochromatic layers can be expanded to many more layers by using various transformations. For example, these original six monochromatic layers can be expanded to 24 layers using three powerful transformations: logarithmic of original image, and contextual of original image, and contextual of logarithm images, as will be described below. An Image logarithm: can be represented by the following equation (1):

$$Y=\log(\max(X,1)) \quad (1)$$

On each pixel, $Y(i,j)=\log(\max(X(i,j),1))$

In equation (1), the variable X represents the original image and the variable Y represents the transformed image. The motivation for introducing image logarithm is to enhance image taken under extreme light conditions, image logarithm reduces extremes in luminance (in all bands). This feature is useful in the night vision, local darkness or local over lightning (spot light). The contextual image can be represented by the following equation (2):

$$Y = X * \begin{bmatrix} -1 & -2 & -1 \\ -2 & +12 & -2 \\ -1 & -2 & -1 \end{bmatrix} \quad (2)$$

In the above-referenced equation (2), the variable X represents the original image, and the variable Y represents the transformed image and the operation * represents a convolution operation. Thus, contextual information can be obtained via linear high pass digital filter with a 3×3 mask, which is realizable utilizing matrix convolution.

Figure 4:
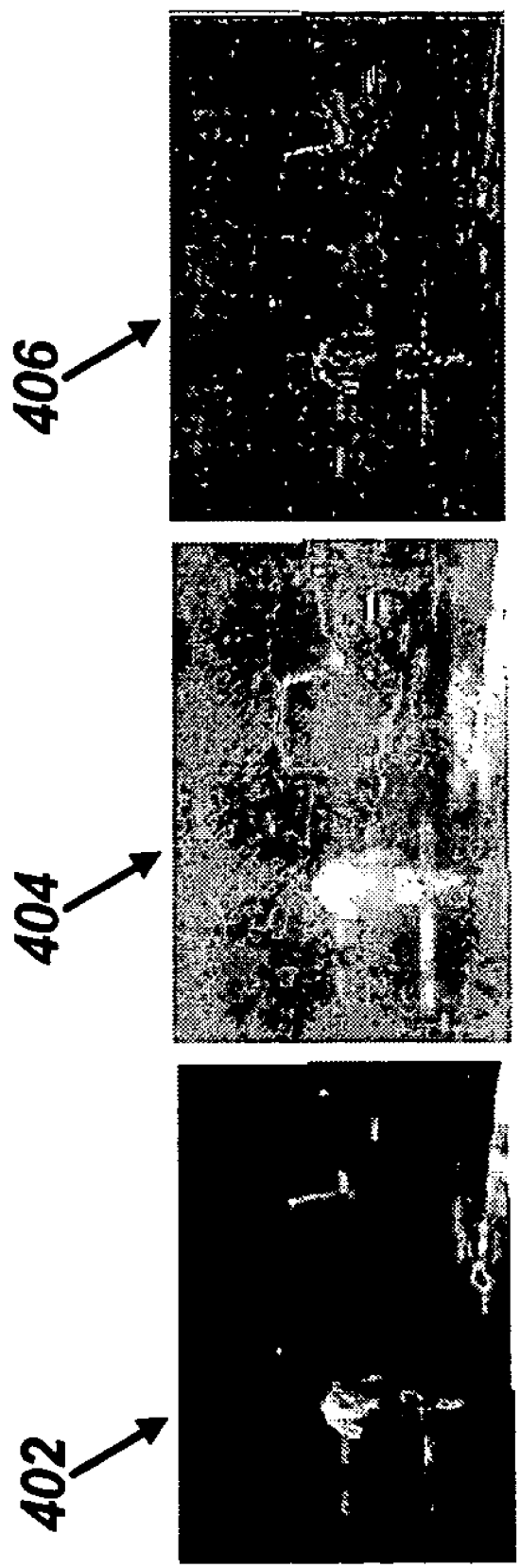
FIG. 4 illustrates a plurality of images captured utilizing the system depicted in FIG. 2 in accordance with a preferred embodiment.

Some illustrative examples are depicted in FIG. 4, which illustrates a plurality of images captured utilizing the system depicted in FIG. 2 in accordance with a preferred embodiment. In FIG. 4, three images 402, 404, 406 are depicted. Image 402 represents an original red band image, while image 404 constitutes an image based on a logarithm of the red band. Image 406 represents the context of the red band.

Figure 5:
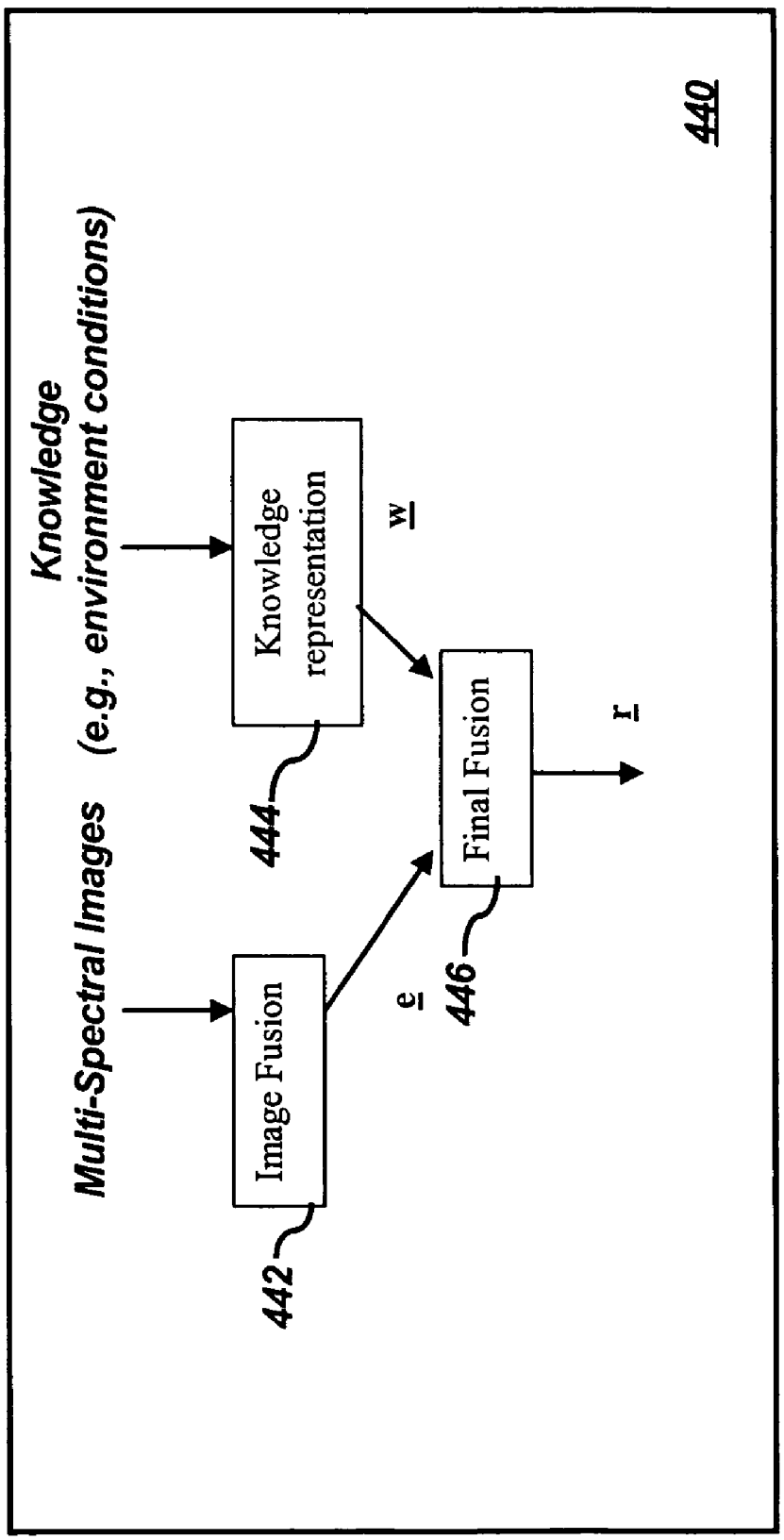
FIG. 5 illustrates a block diagram generally depicting the general solution of knowledge based fusion, in accordance with a preferred embodiment.

FIG. 5 illustrates a block diagram generally depicting the general solution 440 of knowledge based fusion, in accordance with a preferred embodiment. As indicated by the solution 440 depicted in FIG. 5, a block 442 generally represents the actual image fusion operation, while block 444 represents the knowledge representation operation. The final fusion operation is indicated in solution 440 by block 446.

In the example depicted in FIG. 5, the final fusion represented by block 446 is result r coming from image fusion result e and knowledge representation w. The process depicted in FIG. 5 may involve many operations on e and w to get r, for example, '+', '×', or other operator. In the example illustrated herein, the use '×' operator is utilized as an example, so r=e×w. It can be appreciated, however, that applications are not limited to only an '×' operator.

First, it is important to describe the knowledge representation w, which may come from environment conditions, such as windy, rainy, cloudy, hot weather. It is known that these original six monochromatic layers can be expanded to many more layers, here 24 layers, so w is a 1*24 row vector.

The vector w coming from $Wsubj:=[ws_1, ws_2, \ldots, ws_{10}]$ for simplicity, the following paragraph describes how to set $Wsubj:=[ws_1, ws_2, \ldots, ws_{10}]$.

The user's input level can be represented by a 10-vector of intuitive or subjective information that is quantified by real numbers in range 0-9. The meaning of those 10 numbers is ambiguous. First, it represents a flag if the entity (described below) has to be taken into account. Second, if non-zero, then it simultaneously represents a subjective weight, which the user can place on the entity. The 10-vector has following form of equation (3):

$$Wsubj:=[ws_1, Ws_2, \ldots, ws_{10}], \quad (3)$$

In equation (3), the meaning of the 10 entities/weights can be summarized as follows: $ws_1$, as weight of RED (0 ... 9), $ws_2$ as weight of GREEN (0 ... 9), $ws_3$ as weight of BLUE (0 ... 9), $ws_4$ as weight of LONG IR (0 ... 9), $ws_5$ as weight of MID IR (0 ... 9), $ws_6$ as weight of NEAR IR (0 ... 9), $WS_7$ as weight of intensities (0 ... 9), $ws_8$ as weight of logarithms (0 ... 9), $ws_9$ as weight of original (0 ... 9), $ws_{10}$ as weight of context (0 ... 9). Zero value means that the corresponding entity is omitted (flag). Additionally, the following variables can be set as follows: $ws_1=ws_2=ws_3$. Thus, there are only eight numbers to be defined.

Introducing these subjective weights is based on typical video surveillance operator behavior. These subjective weights can be given clear physical meaning. The first three represent the reliability of visible camera (and as mentioned, they can even be defined by just one number), the next three the same for IR camera. Thus, if it is known, for example, that the long wave IR camera 102 is not working properly it is easy to set up ws4=0. The same applies to changing light conditions—during sunny day the visible camera should be preferred, where in dark scene the IR cameras will be more important. The next pair (weights of image logarithm vs. standard image) can be explained based on the increasing extreme light conditions (spot light, local darkness, etc) of the image logarithm and should be preferred and otherwise. The last pair (weights of image context vs. standard image)—with increasing weight of image context, the details, edges etc are enhanced, so the overall image can be less informative (too detailed), but some particular parts of the scene can in fact offer better visibility.

Obviously, the goal is to pre-define sets of these subjective weights for operators in advance, but it seems to be possible to allow users to define their own sets without any knowledge of existence of separate bands; just by specifying 8 numbers.

Next it can be demonstrated how w (1*24 row vector) is derived from $Wsubj:=[ws_1, ws_2, \ldots, ws_{10}]$. Based on the 6 input spectral bands and on the 10-vector Wsubj, an extended (up to 24-vector) vector of new weights $w:=[w_1, w_2, \ldots, w_{24}]$ can be defined in the following manner:

let initially w =[1,1, . . . , 1], then

1. $w_i:=w_i.ws_i \bmod 6$, $i=1, \ldots, 6$—This means that weight $ws_i$ is spread as $w_i$, $w_{i+6}$, $w_{i+12}$, $w_{i+18}$
2. $w_{1+6,13+18}:=w_{1+6,13+18}.ws_7$—This means a subjective influence of the intensity forcing
3. $w_{7+12,19+24}:=w_{7+12,19+24}.ws_8$—This means a requirement on evaluation of the logarithm of the original images
4. $w_{1+12}:=w_{1+12}.ws_9$—This means a subjective enforcement of the original images
5. $w_{13+24}:=w_{13+24.ws10}$—This means the application of the contextual information extraction from the original and/or logarithm images.

Next it is described how to obtain the e vector using PCA as indicated in FIG. 5. Images can then be fused and transformed up to 24 layers. A 3-dimensional matrix M(m,n,l) can be utilized, where the variable m represents the number of rows of image pixels and the variable n represents the number of columns of image pixels and 1≦24 represents a number of levels from the previous step. In order to avoid a bias in the subsequent statistical evaluations, the standardization operation should preferably be individually applied to every of 24 layers as indicated by equation (4) below:

$$M(m, n, j) := \frac{M(m, n, j) - \text{Mean}(M(m, n, j))}{\sqrt{\text{variance}(M(m, n, j))}}, \quad j = 1, \ldots, l \quad (4)$$

In general, the individual images are not independent. The mutual covariance of images are calculated for the image pairs and then collected to the covariance matrix. The first step of spectral analysis involves pattern set forming. Every row of resulting matrix corresponds to adequate multicolor pixel while every column corresponds to color or pseudo-color level. The resulting 2-dimensional pattern matrix takes the following form:P(mn,l), where $j^{th}$ column $j=1, \ldots, l$ contains the $j^{th}$ matrix M(m,n,j)with the rows subsequently ordered into one column.

The covariance matrix can be obtained via left matrix multiplication by the transposition of itself $P^T(mn,l)\cdot(mn,l)$, which is a l×l matrix. The spectral properties of given covariance matrix comes to the first principal component ($PCA_1$) which is represented as eigenvector of image weights $e_j, j=1, \ldots, l$. The result of PCA is the variable e, which can be represented by a (1*24 row vector).

As a next step, the resulted eigenvectors can be adjusted accordingly to the formerly obtained weights $w_j, j=1, \ldots, l$ $$r_j = w_j.e_j, j=1, \ldots, l \quad (5)$$

The final step is the obvious normalization of the weights:

$$r_j^* = r_j \bigg/ \sum_{i=1}^{l} r_i \quad (j=1, \ldots, l)$$

The resulting fused image F takes the form:

$$F = \sum_{j=1}^{l} r_j^* M(m, n, j)$$

An additional parameter can be used to improve the visual quality of the fused image F. The contrast (a real number) of the fused image can be altered according to the following formula:

$$F := 128 + 128 \tanh(\text{Contrast}.F).$$

Figure 6:
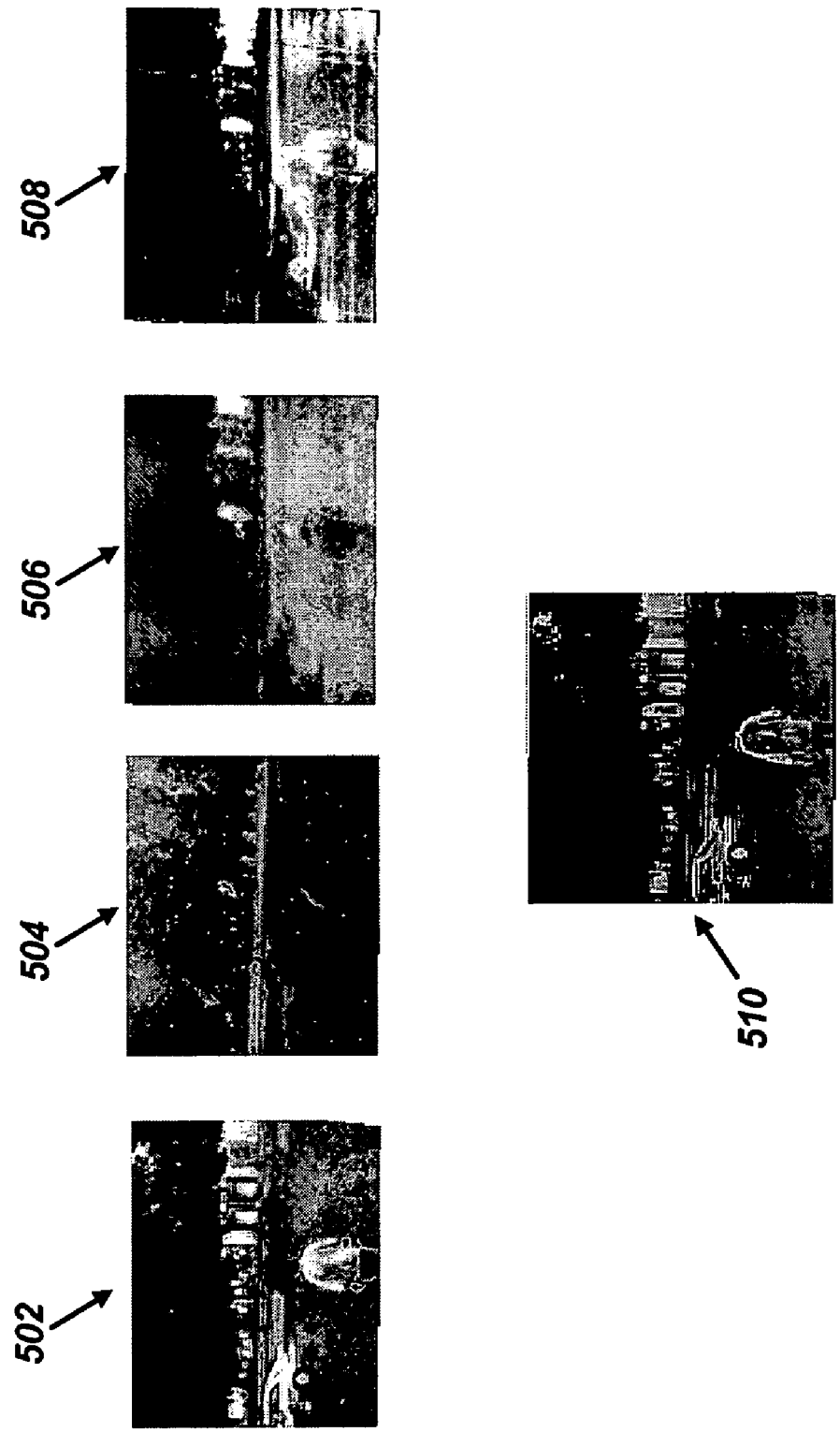
FIG. 6 illustrates a plurality of images captured utilizing the system depicted in FIG. 2 in accordance with a preferred embodiment.

A list of recommended parameter settings can be summarized as follows:

Contrast=½, weights=1 for normal conditions
$w_1, \ldots, w_6$ set to 0 or 1 according to technical conditions on cameras
Contrast=1 . . . 2 for strong vision
$w_7=0$, $w_8=1$ for night vision of details
$w_9=1$, $w_{10}=0$ for snow or sand storm
$w_9=1$, $w_{10}=2 \ldots 9$ for strong sharpening
$w_9=2 \ldots 9$, $w_{10}=1$ for weak sharpening As described above, the definition of subjective weights can be accomplished in advance for all environmental conditions. These settings can be tested under different environmental conditions. The examples depicted in FIG. 6 represent some testing results. FIG. 6 illustrates a plurality of images 502, 504, 506, 508, and 510 captured utilizing the system depicted in FIG. 2 in accordance with a preferred embodiment. In semi dark environmental conditions, the variable:

$W_{subj}$=[111 0.50.5 0.5 51 31]

Wsubj=[0.50.50.5 10.6 0.5 51 31]

Figure 7:
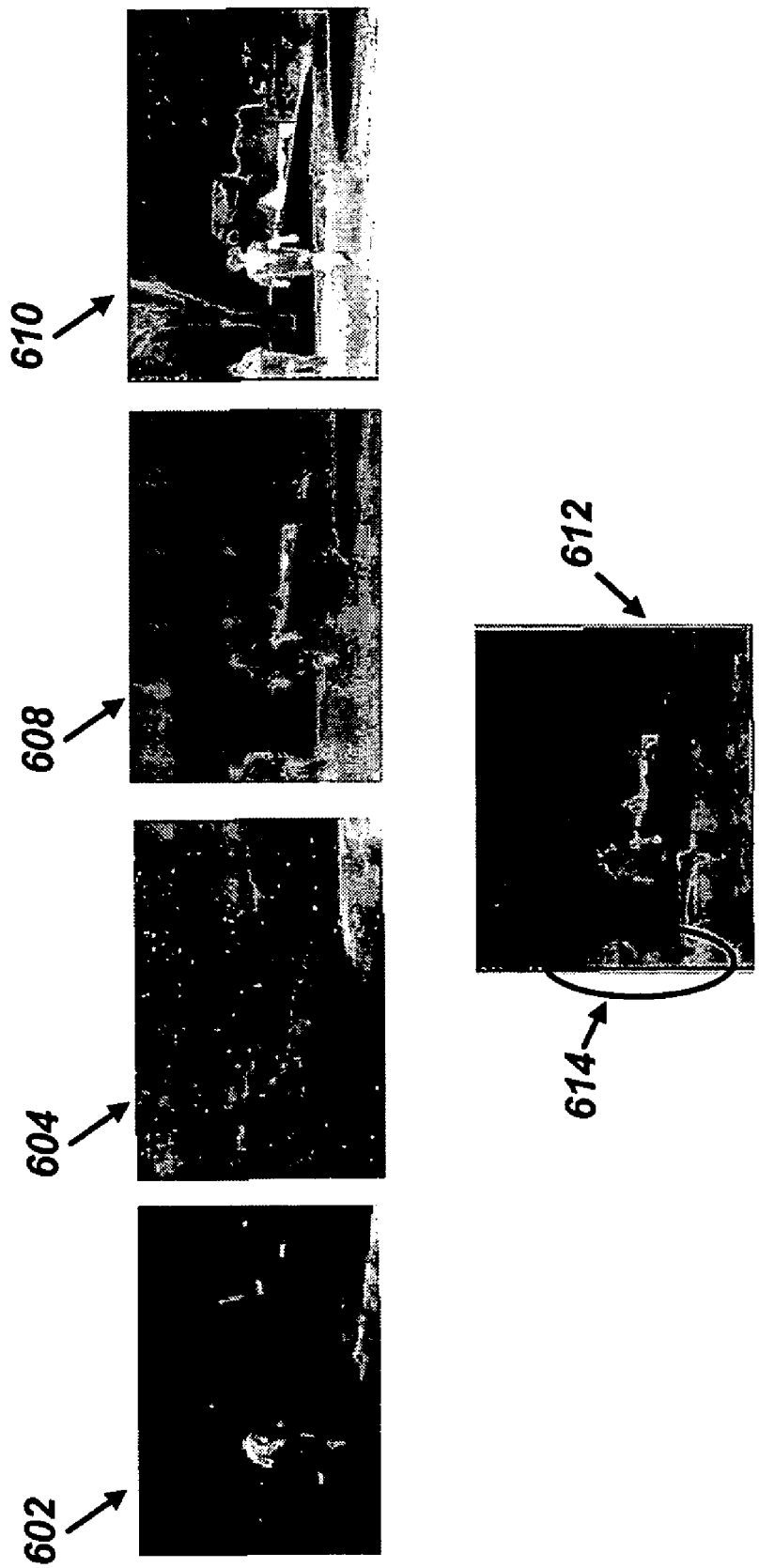
FIG. 7 illustrates a plurality of images captured utilizing the system depicted in FIG. 2 in accordance with a preferred embodiment.

FIG. 7 illustrates a plurality of images captured utilizing the system depicted in FIG. 2 in accordance with a preferred embodiment. Images 602, 604, 608, 610, and 612 are depicted in FIG. 7 and respectively represent visible, near, mid long and finally a fused image (i.e., image 610). A long IR camera is generally preferred for such image processing operations, but other cameras can be utilized with significant weight, because even a visible camera can generate a quality image. Again standard images are preferred to logarithm or contextual image, but these are still considered. Note that in the images depicted in FIG. 7, a person is located at the left of the image 612 (i.e., see person with oval 614), which cannot be seen on a visible camera output, but is quite clear via the long wave IR camera 102 depicted in FIGS. 1-2. Unlike a pure long IR camera, the fused image still contains information present (e.g. visible camera only).

Based on the foregoing it can be appreciated that a system and methodology are disclosed in which the prior knowledge of environmental conditions is integrated with a fusion algorithm, such as, for example, principle component analysis $(PCA). The final weight from each source of the image will be "a prior" '*' weights from PCA. A list of environmental conditions can be associated with the prior weight. That is, the contrast is equivalent to ½, and weights=1 for normal conditions. In this manner, w1, . . . , w6 are sent to 0 or 1 according to the technical conditions associated cameras 102, 104, 106 and/or 108 depicted in FIGS. 1-2.

The contrast can be equivalent to 1 . . . 2 for strong vision, and w7=0, w8-1 for night vision details. Additionally, w9=1, w10=0 for snow or sand storms, and w9=1, w10=2 . . . 9 for strong sharpening. Also, w9=2 . . . 9, w10=1 for weak sharpening. In general, 24 input images can be utilized including visible band images (i.e., R channel, G channel, and B channel), along with near, mid and long IR bands. These original six monochromatic layers can be expanded to 24 layers using three power transformations: logarithmic, contextual, or contextual of logarithmic. Principal component analysis can then be utilized to calculate the fused weight.

The final result can be the fused weight multiplied by the prior weight determined by environmental conditions. Before performing fusion, however, an important pre-processing step involves registration (spatial and temporal alignment, such as field of view, resolution and lens distortion), which ensures that the data at each source refers to the same physical structure. The fusion operation can then be performed using prior knowledge and principal component analysis fusion using PCA and parameters based on and/or indicative of environmental conditions.

Note that embodiments can be implemented in the context of modules. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Software modules generally are composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product based on instruction media residing in a computer memory that can be implemented through signal-bearing media, including transmission media and recordable media, depending upon design considerations and media distribution goals. Such instruction media can thus be retrieved from the computer memory and processed via a processing unit, such as, for example, a microprocessor.

The methodology described above, for example, can be implemented as one or more such modules. Such modules can be referred to also as "instruction modules" and may be stored within a memory of a data-processing apparatus such as a memory of data-process apparatus 202 depicted in FIG. 2. Such instruction modules may be implemented in the context of a resulting program product (i.e., program "code"). Note that the term module and code can be utilized interchangeably herein to refer to the same device or media.

Based on the foregoing, it can be appreciated that a multi-spectral imaging surveillance system, method and program product are described in which a group of imaging cameras is associated with a data-processing apparatus. A module or set of instruction media can be provided, which resides in a memory of the data-processing apparatus. The module performs fusion of a plurality images respectively generated by varying imaging cameras among the plurality of imaging cameras.

Fusion of the images can be based on a plurality of parameters indicative of environmental conditions in order to achieve enhanced imaging surveillance thereof. The final fused images are the result of two parts: the image fusion part, and t the knowledge representation part. In the example described herein, for the image fusion part, Principal Component Analysis (PCA) can be utilized. It can be appreciated, however, that any other similar technique may be utilized instead of PCA, depending upon design considerations. For the final fusion a number of different types of operators may be utilized, which can be applied between the image fusion result and knowledge representation part. In the example presented, herein, a multiplication operator has been illustrated, but any other similar technique may be used.

It is contemplated that the use of the present invention can involve components having different characteristics. It is intended that the scope of the present invention be defined by the claims appended hereto, giving full cognizance to equivalents in all respects.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A multi-spectral imaging surveillance system, comprising:
   a plurality of imaging cameras associated with a data-processing apparatus; and
   a module residing in a memory of said data-processing apparatus for fusion of a plurality images respectively generated by varying imaging cameras among said plurality of imaging cameras, wherein said fusion of images is based on a plurality of parameters indicative of environmental conditions in order to achieve enhanced imaging surveillance thereof.

2. The system of claim 1, wherein said fusion of images is further based on implementation of Principal Component Analysis (PCA).

3. The system of claim 1 wherein said plurality of imaging cameras comprises:
   a visible color video camera;
   a near IR camera;
   a mid wave IR camera; and
   a long wave IR camera associated with said visible color video camera, said near IR camera, and said mid wave IR camera, wherein said visible color video camera, said near IR camera, said mid wave IR camera and said long wave IR camera communicate with one another and with said data-processing apparatus.

4. The system of claim 3 wherein at least one imaging camera among said plurality of imaging cameras is calibrated utilizing Digital Acquisition System (DAS) electronics.

5. The system of claim 3 wherein said visible color video camera operates based on a visible wavelength in a range of approximately 0.4 µm to 0.8 µm.

6. The system of claim 3 wherein said near IR camera operates based on a wavelength in a range of approximately 0.9 µm to 1.7 µm.

7. The system of claim 6 wherein said near IR camera comprises an Indium Gallium Arsenide (InGaAs) focal plane array (FPA).

8. The system of claim 3 wherein said mid wave IR camera operates based on a wavelength in a range of approximately 3 µm to 5 µm.

9. The system of claim 3 wherein said long wave IR camera operates based on a wavelength in a range of approximately 7.5 µm to 13.5 µm.

10. A multi-spectral imaging surveillance method, comprising:
    placing a plurality of imaging cameras aimed at a target, wherein said plurality of imaging cameras generate images of said target;
    fusing said images in a module which resides in a data-processing apparatus, wherein said fusing said images is based on a plurality of parameters indicative of environmental conditions in order to achieve enhanced imaging surveillance thereof;

displaying a plurality of fused images on a monitor associated with said data-processing apparatus; and storing said plurality of fused images in a computer readable memory of said data-processing apparatus.

11. The method of claim 10 wherein said fusing said images is further based on implementation of Principal Component Analysis (PCA).

12. The method of claim 10 wherein said plurality of imaging cameras comprise:
- a visible color video camera;
- a near IR camera;
- a mid wave IR camera; and
- a long wave IR camera associated with said visible color video camera, said near IR camera, and said mid wave IR camera, wherein said visible color video camera, said near IR camera, said mid wave IR camera and said long wave IR camera communicate with one another and with said data-processing apparatus.

13. The method of claim 12 further comprising calibrating at least one imaging camera among said plurality of imaging cameras utilizing Digital Acquisition System (DAS) electronics.

14. The method of claim 12 wherein said visible color video camera operates based on a visible wavelength in a range of approximately 0.4 µm to 8.9 µm.

15. The method of claim 12 wherein said near IR camera operates based on a wavelength in a range of approximately 0.9 µm to 1.7 µm.

16. The method of claim 12 wherein said mid wave IR camera operates based on a wavelength in a range of approximately 3 µm to 5 µm.

17. The method of claim 12 wherein said long wave IR camera operates based on a wavelength in a range of approximately 7.5 µm to 13.5 µm.

* * * * *